US012643785B2

(12) United States Patent
Park et al.

(10) Patent No.: US 12,643,785 B2
(45) Date of Patent: Jun. 2, 2026

(54) WATER PURIFIER

(71) Applicant: COWAY CO., LTD., Gongju-si (KR)

(72) Inventors: Seong Min Park, Gongju-si (KR); Hee Do Jung, Gongju-si (KR)

(73) Assignee: COWAY CO., LTD., Gongju-si (KR)

( * ) Notice: Subject to any disclaimer, the term of this patent is extended or adjusted under 35 U.S.C. 154(b) by 156 days.

(21) Appl. No.: 18/692,214

(22) PCT Filed: Sep. 2, 2022

(86) PCT No.: PCT/KR2022/013194
§ 371 (c)(1),
(2) Date: Mar. 14, 2024

(87) PCT Pub. No.: WO2023/043103
PCT Pub. Date: Mar. 23, 2023

(65) Prior Publication Data

US 2024/0425349 A1 Dec. 26, 2024

(30) Foreign Application Priority Data

Sep. 14, 2021 (KR) ........................ 10-2021-0122579

(51) Int. Cl.
*B67D 1/08* (2006.01)
*B67D 1/00* (2006.01)
*B67D 1/12* (2006.01)

(52) U.S. Cl.
CPC .............. *B67D 1/1211* (2013.01); *B67D 1/00* (2013.01); *B67D 1/08* (2013.01); *B67D 1/0895* (2013.01); *B67D 1/12* (2013.01)

(58) Field of Classification Search
CPC ...... B67D 1/1211; B67D 1/0895; B67D 1/00; B67D 1/08; B67D 1/12
See application file for complete search history.

(56) References Cited

U.S. PATENT DOCUMENTS 10,793,446 B2 * 10/2020 Kim .......................... C02F 1/02
12,382,553 B2 * 8/2025 Kim ....................... G05B 15/02
2021/0298135 A1 * 9/2021 Kim ..................... B67D 3/0041

FOREIGN PATENT DOCUMENTS

CN 110222409 A 9/2019
KR 10-1568984 B1 11/2015
(Continued)

OTHER PUBLICATIONS

International Search Report mailed on Dec. 21, 2022 in PCT/KR2022/013194 filed on Sep. 2, 2022 (citing references 15-19 therein, 2 pages).

*Primary Examiner* — Frederick C Nicolas
(74) *Attorney, Agent, or Firm* — Oblon, McClelland, Maier & Neustadt, L.L.P.

(57) ABSTRACT

The present invention relates to a water purifier characterized by including: a purified water supply unit for supplying purified water produced by filtering raw water; a hot water generation unit for generating hot water by heating the purified water supplied from the purified water supply unit; a hot water discharge unit for discharging the hot water generated by the hot water generation unit to the outside; and a control unit which receives a set temperature and a set water discharge quantity of the hot water as input and controls the purified water supply unit, the hot water generation unit, and the hot water discharge unit such that the hot water is discharged at the set temperature in the set water discharge quantity, wherein the hot water generation unit includes a storage member for storing the purified water and a heater for heating the purified water stored in the storage member, and the control unit operates the heater when the hot water is being discharged to the outside by the hot water discharge unit, and stops the heater according to a predetermined criterion before the water discharge quantity of the
(Continued)

hot water reaches the set water discharge quantity and the water discharging is terminated.

8 Claims, 4 Drawing Sheets

(56) References Cited

FOREIGN PATENT DOCUMENTS

| | | | |
|---|---|---|---|
| KR | 10-2017-0125561 | A | 11/2017 |
| KR | 10-2018-0106229 | A | 10/2018 |
| KR | 10-2247220 | B1 | 5/2021 |
| WO | WO 2016/063568 | A1 | 4/2016 |
| WO | WO 2020/170248 | A1 | 8/2020 |

* cited by examiner

WATER PURIFIER

TECHNICAL FIELD

The present invention relates to a water purifier, and more particularly, to a water purifier capable of providing hot water at two or more different set temperatures.

BACKGROUND

A water purifier is an apparatus for providing purified water by filtering raw water supplied from the outside. In recent years, as users' demand for fresh water purification and hygiene increases, direct water purifiers that do not have storage tanks are spreading. In addition to supplying purified water, these direct water purifiers also generate and supply cold water and hot water by cooling or heating the purified water.

Generally, direct water purifiers adopt an instantaneous heating system to generate hot water. In this regard, Coway Co., Ltd.'s Korean Patent Registration No. 10-1568984 discloses configurations related to instantaneous hot water temperature control of direct water purifiers using triac operation control. In more detail, this patent relates to quickly turning on/off the heater through triac, and suggests a configuration for stopping the heater when hot water reaches a set temperature when heating purified water to generate hot water.

This method of operation may be suitable for instantaneous heating for high-temperature water generation, but is not suitable for immediately generating hot water at a low temperature (e.g., 40° C.) after extracting hot water at a high temperature (e.g., 90° C.) due to excessive latent heat. Therefore, it becomes practically difficult to diversify the set temperature of hot water.

To solve this problem, it is common for a direct water purifier to which an instantaneous heating system is applied to adopt a drain flow passage. This means that if hot water at a low temperature (e.g., 40° C.) is to be extracted immediately after hot water extraction at a high temperature (e.g., 90° C.), the remaining high temperature water is discharged to the outside through the drain flow passage to relieve latent heat, and then the generation of the lukewarm water is carried out. Through this, the problem of lukewarm water being generated at a temperature higher than the set temperature due to latent heat can be solved to some extent.

Coway Co., Ltd.'s Korean Patent Registration No. 10-2247220 discloses a direct water purifier capable of generating hot water. The disclosed water purifier has a flow passage connected to the drain for drainage, like the conventional direct water purifier mentioned above.

However, when a drain flow passage is placed, the size of the water purifier inevitably increases and miniaturization becomes difficult. In addition, when installing a water purifier, there is a limitation in having to place a separate drain pipe outside.

(Patent Document 1) Korean Patent Registration No. 10-1568984

(Patent Document 2) Korean Patent Registration No. 10-2247220

SUMMARY OF THE INVENTION

Technical Problem

To solve the above problems, the water purifier according the present invention is to prevent further heating of hot water due to latent heat by stopping a heater before completion of discharging hot water, thereby enabling continuous water discharge even when the temperature of the hot water discharged next is set lower in a considerable range or more than the temperature of the hot water discharged immediately before.

The water purifier according to an exemplary embodiment of the present invention is to prevent further heating due to latent heat while hot water is discharged smoothly at a set temperature by stopping the heater during hot water discharge based on the remaining water discharge quantity or the remaining water discharge time.

The water purifier according to an exemplary embodiment of the present invention is to maximize the efficiency of heater operation by varying a predetermined criterion for stopping the heater during hot water discharge according to the temperature of the purified water supplied to the hot water generation unit.

The water purifier according to an exemplary embodiment of the present invention is to maximize the efficiency of heater operation by varying a predetermined criterion for stopping the heater during hot water discharge according to the temperature of hot water discharged to the outside and to ensure that hot water discharged has a set temperature through feedback control.

The water purifier according to an exemplary embodiment of the present invention is to reduce the size of the water purifier and improve installation efficiency by allowing the drain flow passage to be omitted from the direct water purifier to which the instantaneous heating system is applied.

Technical Solution

To achieve the above objects, the water purifier according to the present invention is characterized by including: a purified water supply unit for supplying purified water produced by filtering raw water; a hot water generation unit for generating hot water by heating the purified water supplied from the purified water supply unit; a hot water discharge unit for discharging the hot water generated by the hot water generation unit to the outside; and a control unit which receives a set temperature and a set water discharge quantity of the hot water as input and controls the purified water supply unit, the hot water generation unit, and the hot water discharge unit such that the hot water is discharged at the set temperature in the set water discharge quantity, wherein the hot water generation unit includes a storage member for storing the purified water and a heater for heating the purified water stored in the storage member, and the control unit operates the heater when the hot water is being discharged to the outside by the hot water discharge unit, and stops the heater according to a predetermined criterion before the water discharge quantity of the hot water reaches the set water discharge quantity and the water discharging is terminated.

In the water purifier according to an exemplary embodiment of the present invention, the set temperature of the hot water may be selected from at least three different temperatures.

In the water purifier according to an exemplary embodiment of the present invention, the three different temperatures may differ by at least 15 to 25° C.

In the water purifier according to an exemplary embodiment of the present invention, the control unit may stop the heater when a remaining water discharge quantity of the hot water remaining until reaching the water discharge quantity or a remaining water discharge time of the hot water remaining until reaching the water discharge quantity is less than or equal to a predetermined reference value.

In the water purifier according to an exemplary embodiment of the present invention, the purified water supply unit may include a purified water flow sensor for measuring the flow rate of purified water supplied to the storage member, and the control unit may determine the remaining water discharge quantity of the hot water or the remaining water discharge time of the hot water based on the flow rate measured by the purified water flow sensor.

In the water purifier according to an exemplary embodiment of the present invention, the hot water discharge unit may include a hot water flow sensor for measuring the flow rate of hot water discharged to the outside, and the control unit may determine the remaining water discharge quantity of the hot water or the remaining water discharge time of the hot water based on the flow rate measured by the hot water flow sensor.

In the water purifier according to an exemplary embodiment of the present invention, the purified water supply unit may include a purified water temperature sensor for measuring the temperature of purified water supplied to the storage member, and the control unit may change the predetermined criterion according to the temperature of the purified water measured by the purified water temperature sensor.

In the water purifier according to an exemplary embodiment of the present invention, the hot water discharge unit may include a hot water temperature sensor for measuring the temperature of hot water discharged to the outside, and the control unit may change the predetermined criterion according to the temperature of the hot water measured by the hot water temperature sensor.

In the water purifier according to an exemplary embodiment of the present invention, the storage member may discharge the hot water to the outside only through the hot water discharge unit.

Advantageous Effects

According to the above configurations, the water purifier according the present invention can prevent further heating of hot water due to latent heat by stopping a heater before completion of discharging hot water, thereby enabling continuous water discharge even when the temperature of the hot water discharged next is set lower in a considerable range or more than the temperature of the hot water discharged immediately before.

The water purifier according to an exemplary embodiment of the present invention can prevent further heating due to latent heat while hot water is discharged smoothly at a set temperature by stopping the heater during hot water discharge based on the remaining water discharge quantity or the remaining water discharge time.

The water purifier according to an exemplary embodiment of the present invention can maximize the efficiency of heater operation by varying a predetermined criterion for stopping the heater during hot water discharge according to the temperature of the purified water supplied to the hot water generation unit.

The water purifier according to an exemplary embodiment of the present invention can maximize the efficiency of heater operation by varying a predetermined criterion for stopping the heater during hot water discharge according to the temperature of hot water discharged to the outside and ensure that hot water discharged has a set temperature through feedback control.

The water purifier according to an exemplary embodiment of the present invention can reduce the size of the water purifier and improve installation efficiency by allowing the drain flow passage to be omitted from the direct water purifier to which the instantaneous heating system is applied.

DETAILED DESCRIPTION OF THE EMBODIMENTS

Figure 1:
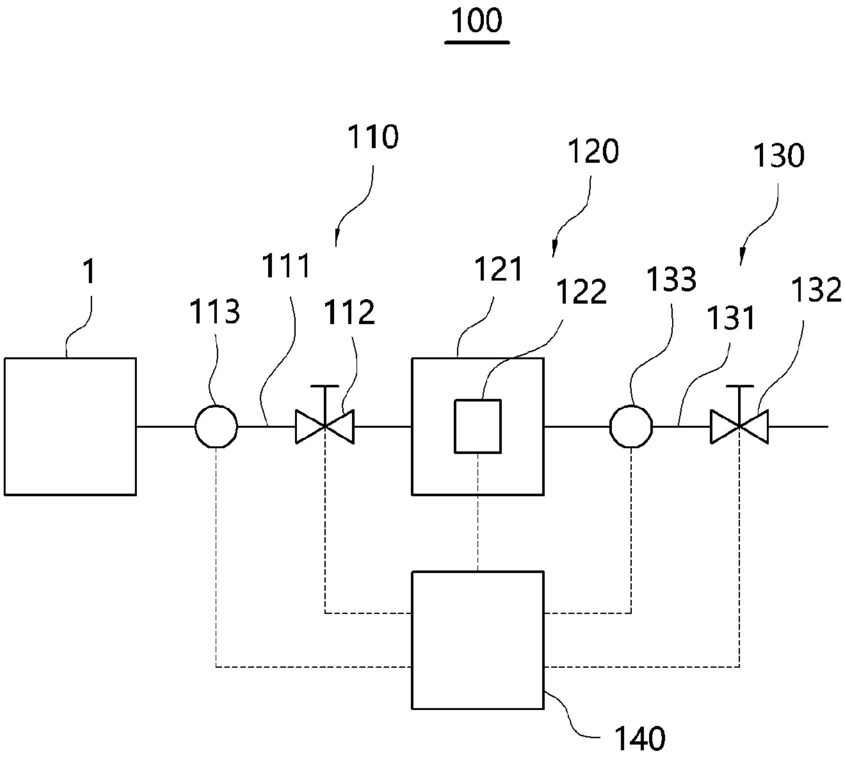
FIG. 1 is a configuration diagram of a water purifier according to an exemplary embodiment of the present invention.

Terms and words used in the present specification and claims should not be construed as limited to their usual or dictionary definition. They should be interpreted as meaning and concepts consistent with the technical idea of the present invention, based on the principle that inventors may appropriately define the terms and concepts to describe their invention in the best way.

The embodiments described in the present specification and the configurations shown in the drawings correspond to preferred embodiments of the present invention, and do not represent all the technical idea of the present invention, so the configurations may have various examples of equivalent and modification that can replace them at the time of filing the present invention.

It should be understood that the terms "comprise" or "have" or the like when used in this specification, are intended to describe the presence of stated features, integers, steps, operations, elements, components and/or a combination thereof but not preclude the possibility of the presence or addition of one or more other features, integers, steps, operations, elements, components, or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Hereinafter, a water purifier according to an exemplary embodiment of the present invention will be described with reference to the accompanying drawings.

FIG. 1 is a configuration diagram of a water purifier according to an exemplary embodiment of the present invention.

The water purifier 100 according to an exemplary embodiment of the present invention provides purified water by filtering raw water supplied from the outside. In this case, the purified water may be generated by a purified water generation unit 1. The purified water generation unit 1 may include a raw water inflow passage through which raw water flows, one or more filters for filtering the introduced raw water.

The water purifier 100 according to an exemplary embodiment of the present invention may be a direct water purifier that does not include a storage tank. In addition, the water purifier 100 according to an exemplary embodiment of the present invention may generate and supply hot water by heating purified water, and may provide multi-stage hot water set temperatures.

Referring to FIG. 1, the water purifier 100 according to an exemplary embodiment of the present invention may be configured to include a purified water supply unit 110, a hot water generation unit 120, a hot water discharge unit 130, and a control unit 140.

The purified water supply unit 110 supplies purified water produced by filtering raw water. In this case, the purified water may be generated by the purified water generation unit 1 and supplied to the purified water supply unit 110. The purified water supply unit 110 supplies purified water to the hot water generation unit 120.

In an embodiment of the present invention, the purified water supply unit 110 includes a purified water supply flow passage 111 for supplying purified water to the hot water generation unit 120, a purified water supply valve 112 disposed in the purified water supply flow passage 111 to open and close a flow passage between the purified water generation unit 1 and the hot water generation unit 120 or to control a flow of purified water to the hot water generation unit 120, and a purified water flow sensor 113 that is connected to the purified water supply flow passage 111 and measures the flow rate of purified water supplied to the hot water generation unit 120.

The hot water generation unit 120 generates hot water by heating purified water supplied from the purified water supply unit 110. The hot water generation unit 120 may instantaneously heat purified water and supply it to the hot water discharge unit 130. In an embodiment of the present invention, the hot water generation unit 120 includes a storage member 121 in which purified water is stored, and a heater 122 that heats purified water stored in the storage member 121.

The storage member 121 provides a space in which the purified water introduced from the purified water supply unit 110 temporarily stays or flows and is heated, and the heater 122 heats the purified water that stays in the space or flows in the space. That is, the purified water flowing into the storage member 121 from the purified water supply unit 110 may be heated by the heater 122 while temporarily staying in the storage member 121 or flowing from an inlet to an outlet of the storage member 121.

The hot water discharge unit 130 discharges hot water generated by the hot water generation unit 120 to the outside. The hot water discharge unit 130 may discharge hot water in a heated state to have a temperature set by the hot water generation unit 120 to the outside.

In an embodiment of the present invention, the hot water discharge unit 130 includes a hot water discharge flow passage 131 for communicating the hot water generation unit 120 with the outside to discharge hot water to the outside, a hot water discharge valve 132 disposed in the hot water discharge flow passage 131 to open and close a flow passage between the hot water generation unit 120 and the outside or adjust the degree of hot water discharge to the outside, and a hot water temperature sensor 133 connected to the hot water discharge flow passage 131 to measure the temperature of hot water discharged to the outside.

The control unit 140 receives a set temperature and a set water discharge quantity of hot water as input, and controls the purified water supply unit 110, the hot water generation unit 120, and the hot water discharge unit 130 such that the hot water is discharged at the set temperature in the set water discharge quantity. In this case, the set temperature and the set water discharge quantity of the hot water may be set through a user input interface (not shown), and the user input interface may categorize the set temperature and the set water discharge quantity of hot water into several stages and present them to the user, and the user may select a specific temperature and a set water discharge quantity as the set temperature and the set water discharge quantity of the hot water.

In an embodiment of the present invention, the set temperature of the hot water may be selected from at least three different temperatures. In other words, the water purifier 100 according to an exemplary embodiment of the present invention may provide multi-stage hot water set temperatures.

More specifically, the three different temperatures may be characterized as having a difference of at least 15 to 25° C. For example, the multistage hot water set temperature may have a first set temperature of 90° C., a second set temperature of 70° C., and a third set temperature of 45° C. Here, the first set temperature may be a temperature suitable for making coffee, the second set temperature may be a temperature suitable for making tea, and the third set temperature may be a temperature suitable for mixing powdered milk.

In general, hot water having a high set temperature may be continuously extracted after hot water having a low set temperature is extracted. However, it is very difficult to extract hot water with a lower set temperature than a certain range immediately after extracting hot water with a high set temperature due to the latent heat of the heating system. Here, the latent heat of the heating system is used to cover all the remaining heat in the storage member 121 and the heater 122 of the hot water generation unit 120 even after the heater 122 is stopped, and the latent heat of hot water remaining inside the storage member 121 and the hot water discharge flow passage 131, and the like.

For example, hot water extraction at the second set temperature after hot water extraction at the first set temperature and hot water extraction at the third set temperature after hot water extraction at the second set temperature may be performed smoothly because the difference between the previous set temperature and the next set temperature is around 20° C. However, extracting hot water at the third set temperature after extracting hot water at the first set temperature is difficult to match the third set temperature when hot water is generated due to the latent heat of the heating system, and continuous immediate extraction is not possible because the difference between the previous set temperature and the next set temperature is large around 45° C. In other words, there is a problem that hot water having a temperature higher than the third set temperature is extracted during continuous extraction.

However, in the present invention, the control unit 140 operates the heater 122 when the hot water is being discharged to the outside by the hot water discharge unit 130, and stops the heater 122 according to a predetermined criterion before the water discharge quantity of the hot water reaches the set water discharge quantity and the water discharging is terminated. Through this, latent heat of the heating system may be minimized, and continuous hot water may be immediately extracted even when there is a large difference between the previous set temperature and the next set temperature. The predetermined criterion may vary according to the performance (capacity) of the heater 122. In addition, various environmental factors such as the capacity of the storage member 121 may also influence the determination of the predetermined criterion.

In an embodiment of the present invention, the control unit 140 may stop the heater 122 when a remaining water discharge quantity of hot water remaining until reaching the water discharge quantity or a remaining water discharge time of hot water remaining until reaching the water discharge quantity is less than or equal to a predetermined reference value. The predetermined reference value is set so that even if the heater 122 is stopped, the water is heated through the latent heat of the heating system so that the temperature of the hot water discharged from the time when the heater 122 is stopped to the end of the hot water discharge may be maintained to the set temperature or almost close to the set temperature.

As described above, the purified water supply unit 110 includes a purified water flow sensor 113 that measures the flow rate of purified water supplied to the storage member 121. The flow rate of purified water measured by the purified water flow sensor 113 may correspond to the flow rate of hot water discharged to the outside. Therefore, the control unit 140 may determine the remaining water discharge quantity of the hot water or the remaining water discharge time of the hot water based on the flow rate measured by the purified water flow sensor 113.

Figure 2:
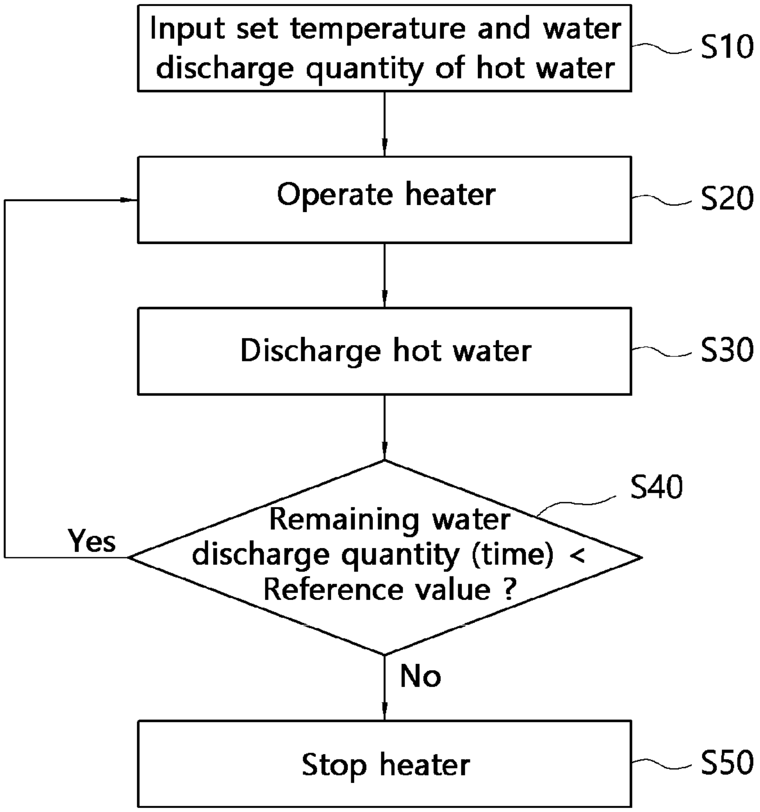
FIG. 2 is a flow chart of a hot water generation method performed by a water purifier according to an exemplary embodiment of the present invention.

FIG. 2 is a flow chart of a hot water generation method performed by a water purifier according to an exemplary embodiment of the present invention. A control process performed by the control unit 140 in relation to the generation and discharge of hot water in the water purifier 100 according to an exemplary embodiment of the present invention will be described with reference to FIG. 2.

First, the control unit 140 receives a set temperature of hot water and a set water discharge quantity as input in step S10. As described above, the set temperature of the hot water and the set water discharge quantity may be input through a user input interface (not shown).

Next, the control unit 140 operates the heater 122 of the hot water generation unit 120 in step S20. In this case, the control unit 140 opens the purified water supply valve 112 of the purified water supply unit 110 so that purified water flows into the storage member 121 of the hot water generation unit 120, and the purified water flowing into the storage member 121 is heated by the heater 122.

Subsequently, the control unit 140 controls hot water to be discharged through the hot water discharge unit 130 in step S30. Specifically, the control unit 140 may open the hot water discharge valve 132 of the hot water discharge unit 130 to allow hot water heated inside the storage member 121 to be discharged to the outside through the hot water discharge flow passage 131. In an embodiment of the present invention, the heater operating step S20 and the hot water discharging step S30 are simultaneously performed until the heater 122 is stopped according to a predetermined criterion.

Next, the control unit 140 determines whether the remaining water discharge quantity until the hot water discharge quantity of hot water reaches the set water discharge quantity or the remaining extraction time of hot water until the completion of hot water discharge is less than or equal to the reference value in step S40. The reference value may be determined in advance taking into account factors such as the performance (capacity) of the heater 122, the capacity of the storage member 121, and various test results.

As a result of the determination of the control unit 140, if the remaining water discharge quantity or the remaining extraction time does not reach the reference value, the hot water discharge and the operation of the heater continue together.

Finally, as a result of the determination of the control unit 140, when the remaining water discharge quantity or the remaining extraction time reaches the reference value, the control unit 140 stops the heater 122 in step S50. Accordingly, the heater 122 is stopped before the discharge of hot water is completed, and hot water is generated through the latent heat of the heating system from the time the heater 122 is stopped until the discharge of hot water is completed.

Figure 3:
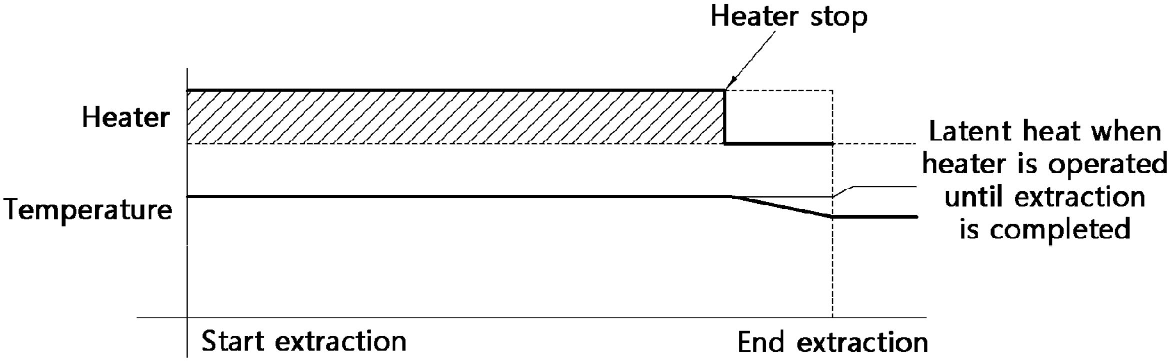
FIG. 3 is a graph illustrating an operation of a heater and a temperature of hot water in a hot water extraction process of a water purifier according to an exemplary embodiment of the present invention.

FIG. 3 is a graph illustrating an operation of a heater and a temperature of hot water in a hot water extraction process of a water purifier according to an exemplary embodiment of the present invention. Referring to FIG. 3, according to the conventional method in which the heater 122 is operated until the hot water discharge is completed when hot water is generated through instantaneous heating, it may be confirmed that the temperature of the hot water remaining inside the water purifier 100 rises due to the latent heat of the heating system after the hot water discharge is completed (latent heat when the heater is operated until the extraction is completed). In comparison, when the control according to the present invention is performed, the heater 122 is stopped according to a predetermined criterion before hot water discharge is completed when hot water is generated through instantaneous heating, and the latent heat of the heating system may be relieved by additionally generating hot water by the latent heat of the heating system (temperature when the heater is stopped). The temperature of hot water generated after stopping the heater 122 may be somewhat lower than the set temperature, but considering the degree of lowering the temperature and the hot water discharge quantity discharged after stopping the heater 122, the temperature of the entire discharged hot water is hardly different from the set temperature.

Meanwhile, the control unit 140 may change the predetermined criterion according to the temperature of hot water measured by the hot water temperature sensor 133. That is, the control unit 140 may determine whether the temperature of hot water discharged through the temperature of hot water measured by the hot water temperature sensor 133 corresponds to a set hot water temperature, and perform feedback control.

For example, when the temperature of hot water measured by the hot water temperature sensor 133 is higher than the set hot water temperature, the control unit 140 may change the predetermined criterion so that the heater 122 is stopped earlier before the water discharge of hot water is completed. In addition, when the temperature of hot water measured by the hot water temperature sensor 133 is lower than the set hot water temperature, the control unit 140 may change the predetermined criterion so that the heater 122 is stopped later before the water discharge of hot water is completed.

In addition, the water purifier 100 according to an exemplary embodiment of the present invention may not include a drain flow passage. In other words, the storage member 121 may be configured to discharge hot water to the outside only through the hot water discharge unit 130. The water purifier 100 according to an exemplary embodiment of the present invention can provide multi-stage hot water set temperatures while effectively relieving latent heat of the heating system as described above, and thus, does not require relief of latent heat through a drain flow passage for draining residual hot water therein. Accordingly, the water purifier 100 according to an exemplary embodiment of the present invention provides multi-stage hot water set temperatures, heats hot water instantaneously and supplies it directly, while miniaturization is possible through omission of the drain flow passage.

Figure 4:
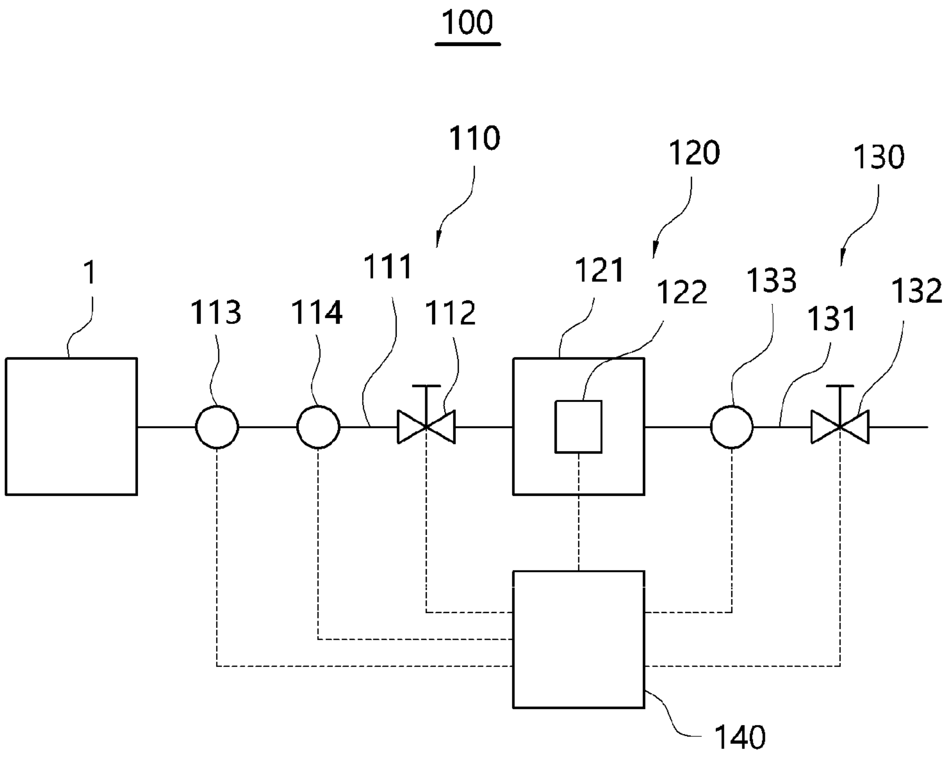
FIG. 4 is a configuration diagram of a case where a water purifier according to an exemplary embodiment of the present invention further includes a purified water temperature sensor.

FIG. 4 is a configuration diagram of a case where a water purifier according to an exemplary embodiment of the present invention further includes a purified water temperature sensor.

Referring to FIG. 4, in the water purifier 100 according to an exemplary embodiment of the present invention, the purified water supply unit 110 may further include a purified water temperature sensor 114 that measures the temperature of purified water supplied to the storage member 121. When the purified water supply unit 110 further includes the purified water temperature sensor 114, the control unit 140 may change the predetermined criterion according to the temperature of the purified water measured by the purified water temperature sensor 114.

For example, when the temperature of purified water measured by the purified water temperature sensor 114 is relatively high, the control unit 140 may change the predetermined criterion so that the heater 122 is stopped earlier before the water discharge of hot water is completed. In addition, when the temperature of purified water measured by the purified water temperature sensor 114 is relatively low, the control unit 140 may change the predetermined criterion so that the heater 122 is stopped later before the water discharge of hot water is completed.

Figure 5:
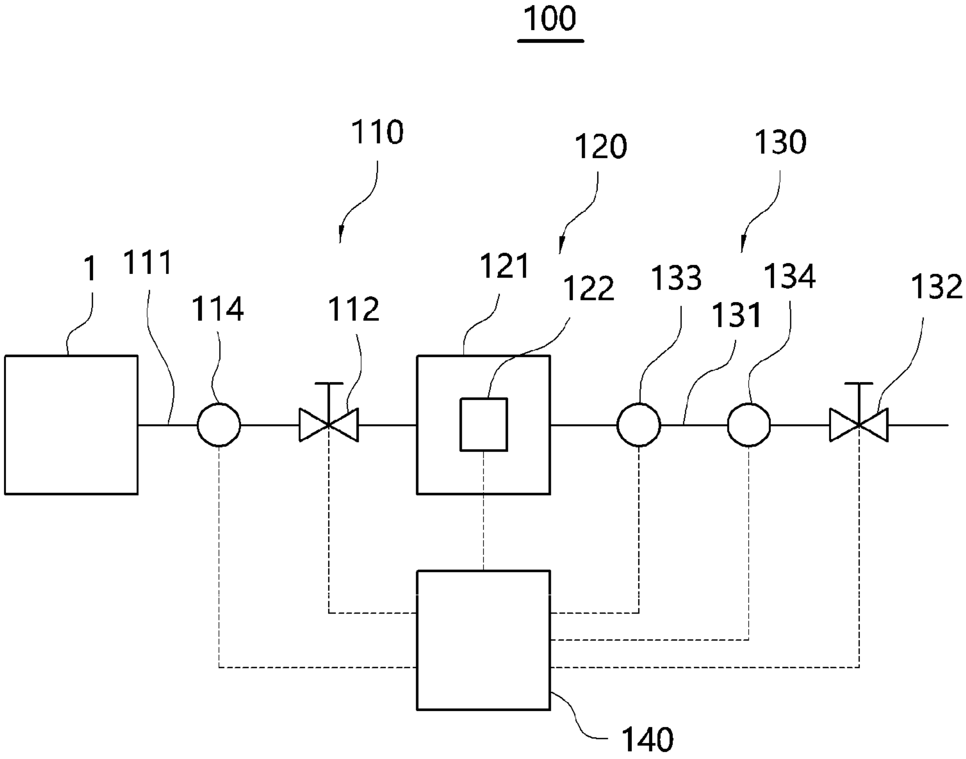
FIG. 5 is a configuration diagram of a modified example of a water purifier according to an exemplary embodiment of the present invention.

FIG. 5 is a configuration diagram of a modified example of a water purifier according to an exemplary embodiment of the present invention.

Referring to FIG. 5, in the water purifier 100 according to an exemplary embodiment of the present invention, the hot water discharge unit 130 may include a hot water flow sensor 134 connected to the hot water discharge flow passage 111 to measure the flow rate of hot water discharged to the outside. In this case, the purified water flow sensor 113 provided in the purified water supply unit 110 may be omitted.

In this way, when the hot water discharge unit 130 has a hot water flow sensor 134 that measures the flow rate of hot water discharged to the outside, the control unit 140 may determine the remaining water discharge quantity of the hot water or the remaining water discharge time of the hot water based on the flow rate measured by the hot water flow sensor 134.

Meanwhile, the water purifier 100 according to an exemplary embodiment of the present invention may further include a purified water discharge unit (not shown), a cold water generation unit (not shown), and a cold water discharge unit (not shown). In other words, purified water generated by the purified water generation unit 1 may be discharged to the outside through the purified water discharge unit or may be generated as cold water by the cold water generation unit and then discharged to the outside through the cold water discharge unit.

Although exemplary embodiments of the present invention have been described above, the idea of the present invention is not limited to the embodiments set forth herein. Those of ordinary skill in the art who understand the idea of the present invention may easily propose other embodiments through supplement, change, removal, addition, etc. of elements within the scope of the same idea, but the embodiments will be also within the idea scope of the present invention.

What is claimed is:

1. A water purifier, comprising:

a purified water supply unit for supplying purified water produced by filtering raw water;

a hot water generation unit for generating hot water by heating the purified water supplied from the purified water supply unit;

a hot water discharge unit for discharging the hot water generated by the hot water generation unit to an outside of the water purifier; and a control unit which receives a set temperature and a set water discharge quantity of the hot water as input and controls the purified water supply unit, the hot water generation unit, and the hot water discharge unit such that the hot water is discharged at the set temperature in the set water discharge quantity, wherein the hot water generation unit comprises a storage member for storing the purified water and a heater for heating the purified water stored in the storage member, and the control unit operates the heater when the hot water is being discharged to the outside by the hot water discharge unit, and stops the heater according to a predetermined criterion before the water discharge quantity of the hot water reaches the set water discharge quantity and the water discharging is terminated, wherein the control unit stops the heater when a remaining water discharge quantity of the hot water remaining until reaching the water discharge quantity or a remaining water discharge time of the hot water remaining until reaching the water discharge quantity is less than or equal to a predetermined reference value.

2. The water purifier of claim 1, wherein the set temperature of the hot water is selected from at least three different temperatures.

3. The water purifier of claim 2, wherein the different temperatures differ from each other by at least 15 to 25° C.

4. The water purifier of claim 1, wherein the purified water supply unit comprises a purified water flow sensor for measuring the flow rate of purified water supplied to the storage member, and the control unit determines the remaining water discharge quantity of the hot water or the remaining water discharge time of the hot water based on the flow rate measured by the purified water flow sensor.

5. The water purifier of claim 1, wherein the hot water discharge unit comprises a hot water flow sensor for measuring the flow rate of hot water discharged to the outside, and the control unit determines the remaining water discharge quantity of the hot water or the remaining water discharge time of the hot water based on the flow rate measured by the hot water flow sensor.

6. The water purifier of claim 1, wherein the purified water supply unit comprises a purified water temperature sensor for measuring the temperature of purified water supplied to the storage member, and the control unit changes the predetermined criterion according to the temperature of the purified water measured by the purified water temperature sensor.

7. The water purifier of claim 1, wherein the hot water discharge unit comprises a hot water temperature sensor for measuring the temperature of hot water discharged to the outside, and the control unit changes the predetermined criterion according to the temperature of the hot water measured by the hot water temperature sensor.

8. The water purifier of claim 1, wherein the storage member discharges the hot water to the outside only through the hot water discharge unit.

* * * * *